(12) United States Patent  (10) Patent No.: US 7,775,244 B2
Kwak et al.  (45) Date of Patent: Aug. 17, 2010

(54) LIQUID CRYSTAL DISPENSING SYSTEM

(75) Inventors: Soo-Min Kwak, Gyeongsangbuk-Do (KR); Hae-Joon Son, Busan (KR)

(73) Assignee: LG Display Co., Ltd., Seoul (KR)

( * ) Notice: Subject to any disclaimer, the term of this patent is extended or adjusted under 35 U.S.C. 154(b) by 1642 days.

(21) Appl. No.: 11/014,238

(22) Filed: Dec. 17, 2004

(65) Prior Publication Data
US 2009/0258563 A1    Oct. 15, 2009

(30) Foreign Application Priority Data
Dec. 17, 2003    (KR) ..................... 10-2003-0092716

(51) Int. Cl.
B65B 1/04    (2006.01)
(52) U.S. Cl. .............. 141/1; 141/83; 141/94; 141/192; 349/158
(58) Field of Classification Search .......... 141/1, 141/11, 31, 67, 83, 94, 95, 192, 198; 222/386, 222/387, 388; 427/256; 118/665, 688; 349/153, 349/158
See application file for complete search history.

(56) References Cited

U.S. PATENT DOCUMENTS

| 3,978,580 | A | 9/1976 | Leupp et al. |
| 4,094,058 | A | 6/1978 | Yasutake et al. |
| 4,653,864 | A | 3/1987 | Baron et al. |
| 4,691,995 | A | 9/1987 | Yamazaki et al. |
| 4,775,225 | A | 10/1988 | Tsuboyama et al. |
| 5,247,377 | A | 9/1993 | Omeis et al. |
| 5,263,888 | A | 11/1993 | Ishihara et al. |
| 5,379,139 | A | 1/1995 | Sato et al. |
| 5,406,989 | A | 4/1995 | Abe |
| 5,499,128 | A | 3/1996 | Hasegawa et al. |
| 5,507,323 | A | 4/1996 | Abe |
| 5,511,591 | A | 4/1996 | Abe |
| 5,539,545 | A | 7/1996 | Shimizu |
| 5,548,429 | A | 8/1996 | Tsujita |
| 5,642,214 | A | 6/1997 | Ishii |
| 5,680,189 | A | 10/1997 | Shiizu et al. |
| 5,742,370 | A | 4/1998 | Kim |
| 5,757,451 | A | 5/1998 | Miyazaki |
| 5,852,484 | A | 12/1998 | Inoue et al. |
| 5,854,664 | A | 12/1998 | Inoue et al. |
| 5,861,932 | A | 1/1999 | Inata |
| 5,875,922 | A | 3/1999 | Chastine et al. |
| 5,952,676 | A | 9/1999 | Sato |
| 5,956,112 | A | 9/1999 | Fujimori |
| 6,001,203 | A | 12/1999 | Yamada |

(Continued)

FOREIGN PATENT DOCUMENTS

CN    1480777    3/2004

(Continued)

*Primary Examiner*—Timothy L Maust
(74) *Attorney, Agent, or Firm*—McKenna Long & Aldridge LLP

(57) ABSTRACT

A liquid crystal dispensing system includes a frame, a stage coupled to the frame; at least one liquid crystal dispenser moveably coupled the frame over the stage, and at least one measurement member operatively coupled to the liquid crystal dispenser, wherein the at least measurement member detecting an amount of liquid crystal material dispensed from the at least one liquid crystal dispenser.

9 Claims, 13 Drawing Sheets

U.S. PATENT DOCUMENTS

| | | | |
|---|---|---|---|
| 6,011,609 A | 1/2000 | Kato | |
| 6,016,178 A | 1/2000 | Kataoka | |
| 6,016,181 A | 1/2000 | Shimada | |
| 6,055,035 A | 4/2000 | Von Gutfeld | |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar | |
| 6,304,306 B1 | 10/2001 | Shiomi | |
| 6,304,311 B1 | 10/2001 | Egami | |
| 6,337,730 B1 | 1/2002 | Ozaki | |
| 6,414,733 B1 | 7/2002 | Ishikawa | |
| 6,782,928 B2 * | 8/2004 | Kweon et al. | 141/192 |
| 7,096,897 B2 * | 8/2006 | Kweon et al. | 141/192 |
| 7,196,763 B2 * | 3/2007 | Park et al. | 349/153 |
| 7,273,077 B2 * | 9/2007 | Ryu et al. | 141/198 |
| 7,306,016 B2 * | 12/2007 | Kweon et al. | 141/192 |
| 7,316,248 B2 * | 1/2008 | Jeong et al. | 141/67 |

FOREIGN PATENT DOCUMENTS

| | | |
|---|---|---|
| CN | 1550829 | 12/2004 |
| EP | 1 003 066 A1 | 5/2000 |
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 6-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-176133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-126578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |

| | | | | | |
|---|---|---|---|---|---|
| JP | 2001-183683 | 7/2001 | JP | 2002-139734 | 5/2002 |
| JP | 2001-201750 | 7/2001 | JP | 2002-156518 | 5/2002 |
| JP | 2001-209052 | 8/2001 | JP | 2002-169166 | 6/2002 |
| JP | 2001-209056 | 8/2001 | JP | 2002-169167 | 6/2002 |
| JP | 2001-209057 | 8/2001 | JP | 2002-182222 | 6/2002 |
| JP | 2001-209058 | 8/2001 | JP | 2002-202512 | 7/2002 |
| JP | 2001-209060 | 8/2001 | JP | 2002-202514 | 7/2002 |
| JP | 2001-215459 | 8/2001 | JP | 2002-214626 | 7/2002 |
| JP | 2001-222017 | 8/2001 | JP | 2002-229042 | 8/2002 |
| JP | 2001-235758 | 8/2001 | JP | 2002-236276 | 8/2002 |
| JP | 2001-255542 | 9/2001 | JP | 2002-258299 | 8/2002 |
| JP | 2001-264782 | 9/2001 | JP | 2002-236292 | 9/2002 |
| JP | 2001-272640 | 10/2001 | JP | 2002-277865 | 9/2002 |
| JP | 2001-281675 | 10/2001 | JP | 2002-277866 | 9/2002 |
| JP | 2001-281678 | 10/2001 | JP | 2002-277881 | 9/2002 |
| JP | 2001-282126 | 10/2001 | JP | 2002-287156 | 10/2002 |
| JP | 2001-305563 | 10/2001 | JP | 2002-296605 | 10/2002 |
| JP | 2001-330837 | 11/2001 | JP | 2002-311438 | 10/2002 |
| JP | 2001-330840 | 11/2001 | JP | 2002-311440 | 10/2002 |
| JP | 2001-356353 | 12/2001 | JP | 2002-311442 | 10/2002 |
| JP | 2001-356354 | 12/2001 | JP | 2002-323687 | 11/2002 |
| JP | 2002-014360 | 1/2002 | JP | 2002-323694 | 11/2002 |
| JP | 2002-023176 | 1/2002 | JP | 2002-333628 | 11/2002 |
| JP | 2002-049045 | 2/2002 | JP | 2002-333635 | 11/2002 |
| JP | 2002-079160 | 3/2002 | JP | 2002-333843 | 11/2002 |
| JP | 2002-080321 | 3/2002 | JP | 2002-341329 | 11/2002 |
| JP | 2002-082340 | 3/2002 | JP | 2002-341355 | 11/2002 |
| JP | 2002-090759 | 3/2002 | JP | 2002-341356 | 11/2002 |
| JP | 2002-090760 | 3/2002 | JP | 2002-341357 | 11/2002 |
| JP | 2002-107740 | 4/2002 | JP | 2002-341358 | 11/2002 |
| JP | 2002-122870 | 4/2002 | JP | 2002-341359 | 11/2002 |
| JP | 2002-122872 | 4/2002 | JP | 2002-341362 | 11/2002 |
| JP | 2002-122873 | 4/2002 | KR | 2000-0035302 | 6/2000 |
| JP | 2002-131762 | 5/2002 | | | |

* cited by examiner

LIQUID CRYSTAL DISPENSING SYSTEM

This application claims the benefit of Korean Patent Application No. 92716/2003, filed on Dec. 17, 2003, which is hereby incorporated by reference for all purposes as if fully set forth herein.

BACKGROUND OF THE INVENTION

1. Field of the Invention

The present invention relates to a liquid crystal dispensing system. More particularly, present invention relates to a liquid crystal dispensing system incorporating gravimeter to facilitate detecting an amount of liquid crystal material being dispensed.

2. Discussion of the Related Art

As various portable electric devices such as mobile phones, personal digital assistant (PDA), note book computers, etc., continue to be developed, various types of flat panel display devices such as liquid crystal displays (LCDs), plasma display panels (PDPs), field emission displays (FEDs), and vacuum fluorescent displays (VFDs), having a compact construction, light weight, and low power-consumption characteristics also continue to be developed. Owing to the ease with which they are driven, and to their superior ability to display images, LCDs are extensively used.

FIG. 1 illustrates a cross sectional view of a related art LCD device.

Referring to FIG. 1, a related art LCD device 1 generally comprises a lower substrate 5, an upper substrate 3, and a liquid crystal layer 7 formed therebetween. The lower substrate 5 (i.e., a driving device array substrate) includes a plurality of pixels (not shown), and a driving device (e.g., a thin film transistor (TFT)) and pixel electrode formed at each pixel. The upper substrate 3 (i.e., a color filter substrate) includes a color filter layer for realizing color and a common electrode. An alignment layer is formed on both the lower and upper substrates 5 and 3 to align liquid crystal molecules of the liquid crystal layer 7. The lower substrate 5 and the upper substrate 3 are attached to each other by a sealant material 9, formed at peripheral regions thereof. Accordingly, the liquid crystal layer 7 is confined within an area defined by the sealant material 9.

Light transmittance characteristics of the pixels are controlled by causing the driving devices to generate electric fields between the pixel electrodes and the common electrode. The generated electric fields reorient liquid crystal molecules of the liquid crystal layer 7 to display a picture.

FIG. 2 illustrates a flow chart of a related art method of fabricating the LCD device shown in FIG. 1.

Referring to FIG. 2, the related art method of fabricating the LCD device described above generally consists of three sub-processes: a TFT array substrate forming process; a color filter substrate forming process; and a cell forming process.

At step S101, a TFT array substrate forming process is performed whereby a plurality of gate lines and data lines are formed on the lower substrate 5 (e.g., a glass substrate) to define an array of pixel areas. TFTs are connected to the gate and the data lines within each pixel area and pixel electrodes are connected to the thin film transistors to drive a subsequently provided liquid crystal layer in accordance with a signal applied through the thin film transistor.

At step S104, a color filter process is performed whereby R, G, and B color filter layers, for realizing predetermined colors, and a common electrode are formed on the upper substrate 3 (i.e., a glass substrate).

At steps S102 and S105, alignment layers are formed over the entire surface of both the lower substrate 5 and upper substrate 3, respectively. Subsequently, the alignment layers are rubbed to induce predetermined surface anchoring characteristics (i.e., a pretilt angle and alignment direction) within the liquid crystal molecules of the liquid crystal layer 7.

At step S103, spacers are dispersed onto the lower substrate 5. At step S106, sealant material 9 is printed at peripheral regions of the upper substrate 3. At step S107, the lower and upper substrates 5 and 3 are pressed and bonded together (i.e., assembled) and the spacers dispersed at step S103 ensure that a cell gap formed between the assembled lower and upper substrates 5 and 3 is uniform.

At step S108, the assembled upper and lower substrates 5 and 3 are cut into unit LCD panels. Specifically, the lower substrate 5 and the upper substrate 3 each include a plurality of unit panel areas, within each of which individual TFT array and color Filter substrates are formed.

At step S109, liquid crystal material is injected into the cell gap of each of the unit LCD panels through a liquid crystal injection hole defined within the sealant material. After each cell gap is completely filled with liquid crystal material, the liquid crystal injection hole is sealed. At step S110, the filled and sealed unit LCD panels are then tested.

FIG. 3 illustrates a related art liquid crystal injection system for fabricating the related art LCD device.

Referring to FIG. 3, a container 12, containing a supply of liquid crystal material 14, is placed into a vacuum chamber 10 that is connected to a vacuum pump (not shown). Subsequently, a unit LCD panel 1, formed as described above with respect to FIG. 2, is arranged over the container 12 using a unit panel handling device (not shown). Next, the vacuum pump is operated to reduce the pressure within the vacuum chamber 10 to a predetermined vacuum state. The unit panel handling device then lowers the unit LCD panel 1 such that the liquid crystal injection hole 16 contacts a surface of the supply of liquid crystal material 14. After contact is established, liquid crystal material 14 contained within the container 12 can be drawn through the liquid crystal injection hole 16 and into the cell gap of the unit LCD panel 1 due to a capillary effect. The injection method described above, therefore, is generally known as a dipping injection method.

After contact is established, the rate at which the liquid crystal material 14 is drawn into to the cell gap of the unit LCD panel 1 can be increased by pumping nitrogen gas ($N_2$) into the vacuum chamber 10, thereby increasing the pressure within the vacuum chamber 10. As the pressure within the vacuum chamber 10 increases, a pressure differential is created between within the cell gap of the unit LCD panel 1 find the interior of the vacuum chamber 10. Accordingly, more liquid crystal material 14 contained by the container 12 can be injected into the cell gap of the unit LCD panel 1 and at an increased injection rate. As mentioned above, once the liquid crystal material 14 completely fills the cell gap of the unit panel 1, the injection hole 16 is sealed by a sealant and the injected liquid crystal material 14 is sealed within the unit LCD panel 1. The injection method described above, therefore, is generally known as a vacuum injection method.

Despite their usefulness, the aforementioned dipping and vacuum injection method methods can be problematic for several reasons.

First, the total amount of time required to completely fill the cell gap of the unit LCD panel 1 with liquid crystal material 14, according to the dipping/vacuum injection methods, can be relatively long. Specifically, a cell gap thickness of the unit LCD panel 1 is only a few micrometers wide. Therefore, only a small amount of liquid crystal material 14 can be injected into the unit panel 1 per unit time. For example, it can take about 8 hours to completely inject liquid crystal material 14 into the cell gap of a 15-inch unit LCD panel, thereby reducing the efficiency with which LCD devices can be fabricated.

Second, the aforementioned dipping/vacuum injection methods require an excessively large amount of liquid crystal material 14 compared to the relatively small amount of liquid crystal material 14 actually injected into the unit LCD panel 1. Because liquid crystal material 14 contained by the container 12 is exposed to the atmosphere, or certain other process gases during loading, and unloading of the unit LCD panel 1 into and out of the vacuum chamber 10, liquid crystal material 14 contained by the container 12 can easily become contaminated. Therefore, the uninjected liquid crystal material 14 must be discarded, thereby reducing the efficiency with which expensive liquid crystal material is used and increasing the cost of fabricating a unit LCD panel 1.

SUMMARY OF THE INVENTION

Accordingly, the present invention is directed to a liquid crystal dispensing system that substantially obviates one or more of the problems due to limitations and disadvantages of the related art.

An advantage of the present invention provides a liquid crystal dispensing system capable of dispensing liquid crystal directly onto a substrate.

Another advantage of the present invention provides a liquid crystal dispensing system efficiently measuring an amount of liquid crystal material dispensed within liquid crystal droplets.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal dispensing system may, for example, include a frame; a stage coupled to the frame; at least one liquid crystal dispenser moveably coupled to the frame over the stage; and at least one measuring means coupled to the stage within a range of motion of the at least one liquid crystal dispenser.

In one aspect of the present invention, at least one liquid crystal dispenser may, for example, include a discharge pump for drawing in liquid crystal material from a container and for discharging the drawn liquid crystal material; and a nozzle in fluid communication with the discharge pump for dispensing the discharged liquid crystal material. In another aspect of the present invention, the discharge pump may, for example, include a cylinder having a suction opening and a discharge opening; and a piston for drawing the liquid crystal material in through the suction opening and for discharging the liquid crystal material out through the discharge opening, wherein the piston is arranged within the cylinder, wherein a groove is arranged in a center region of a lower portion of the piston, and wherein the piston is rotatable and axially translatable within the cylinder.

In one aspect of the present invention, the measuring means may, for example, include a gravimeter assembly. In another aspect of the present invention, the measuring means may, for example, include a measuring cup.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

To resolve problems associated with the aforementioned related art dipping/vacuum injection methods, a liquid crystal dispensing method has been proposed. According to the liquid crystal dispensing method, a liquid crystal layer may be formed by dispensing liquid crystal material directly onto one of the upper or lower substrates. Subsequently, the dispensed liquid crystal material is spread over the substrate upon pressing and bonding the upper and lower substrates together (i.e., assembling the upper and lower substrates). Accordingly, liquid crystal layers may be formed quicker by employing the liquid crystal dispensing method than by employing the related art dipping/vacuum injection methods. Further, the liquid crystal dispensing, method consumes less liquid crystal material thin either of the related art dipping/vacuum injection methods.

Figure 4:
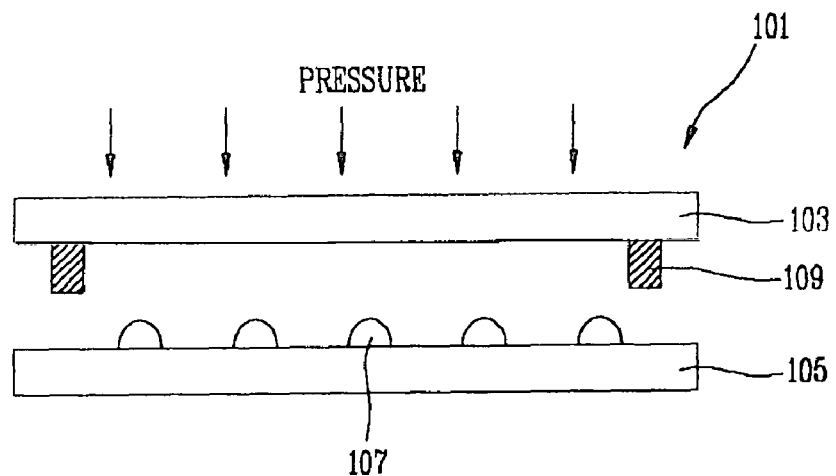
FIG. 4 illustrates a cross sectional view of an LCD device fabricated in accordance with a liquid crystal dispensing method of the present invention.

FIG. 4 illustrates a cross sectional view of all LCD device fabricated by applying the liquid crystal dispensing method.

Referring to FIG. 4, liquid crystal material 107 may be dispensed directly onto one of a lower substrate 105 or all upper substrate 103 prior to assembling the two substrates. In one aspect of the present invention, the lower substrate may include the aforementioned TFT array substrate. In another aspect of the present invention, the upper substrate may include the aforementioned color filter substrate. Sealant material 109 may be applied to peripheral regions of one of the lower or upper substrates 105 or 103, respectively. As mentioned above, the dispensed liquid crystal material 107 spreads between the lower and upper substrates 105 and 103 as the substrates are pressed and bonded together to form an LCD panel 101 having a liquid crystal layer with a substantially uniform thickness.

Figure 5:
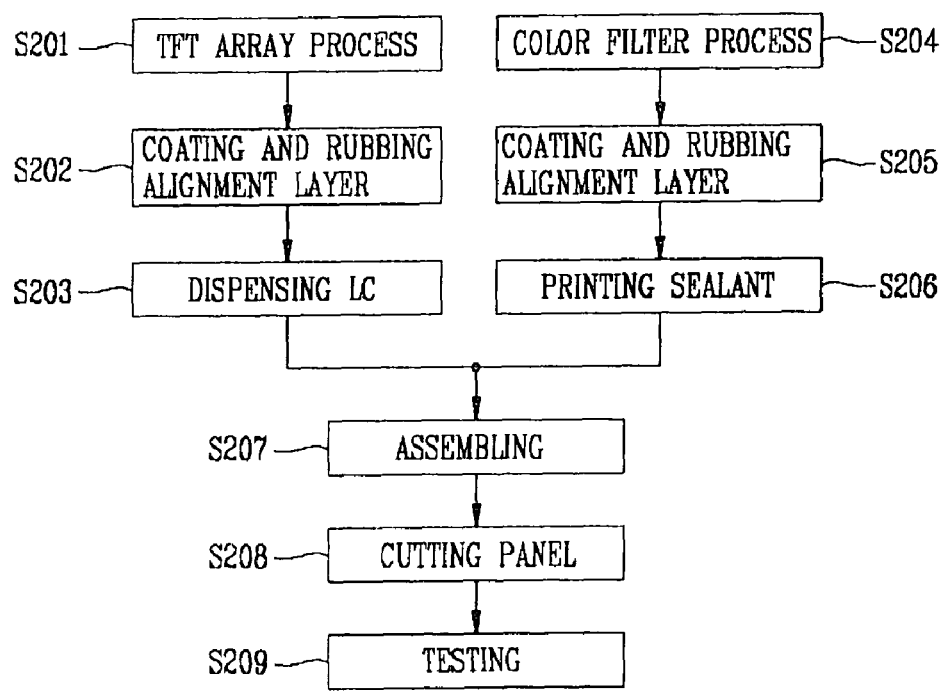
FIG. 5 illustrates a flow chart of a method of fabricating an LCD device according to a liquid crystal dispensing method.

FIG. 5 illustrates a flow chart of a method of fabricating an LCD device according to a liquid crystal dispensing method.

At step S201, all array of driving devices, such as TFTs, may be formed on an lower substrate 105 in a TFT array substrate forming process. In one aspect of the present invention, the TFT array substrate forming process may include steps of forming a plurality of gate lines and data lines on the lower substrate 105 to define an array of pixel areas; connecting TFTs to the gate and the data lines within each pixel area; and connecting pixel electrodes to the TFTs.

At step S204, a color filter layer may be formed on an upper substrate 103 in a color filter substrate forming process. In one aspect of the present invention, the color filter process may include steps of forming R, G, and B color filter layers, for realizing predetermined colors, and a common electrode on the upper substrate 103.

In one aspect of the present invention, the upper and lower substrates 103 and 105, respectively, may be provided as glass substrates having an area of at least about 1000×1200 mm$^2$. It will be appreciated, however, that the upper and lower substrates 103 and 105 may be formed of glass substrates having a smaller area.

At steps S202 and S205, alignment layers may be formed over the entire surface of both the lower and upper substrates. Subsequently, the alignment layers may be imparted with alignment structures via processes such as rubbing, irradiation to predetermined wavelengths of electromagnetic radiation, or the like.

At step S203, liquid crystal material may be dispensed directly onto a unit panel area defined, for example, on the lower substrate 105. At step S206, sealant material 109 may be printed at peripheral regions of a unit panel area defined, for example, on the upper substrate 103. At step S207, the upper and lower substrates 103 and 105 may be aligned and subsequently pressed and bonded together (i.e., assembled). Upon assembling the upper and lower substrates 103 and 105, the dispensed liquid crystal material may be evenly spread between the upper and lower substrates within a region defined by the sealant material.

At step S208, the assembled upper and lower substrates may be cut into a plurality of unit LCD panels. Finally, at step S209, the unit LCD panels may be tested.

In view of the discussion above, fabricating unit LCD panels using the liquid crystal dispensing method is different from fabricating unit LCD panels using the related art dipping/vacuum injection methods.

Figure 1:
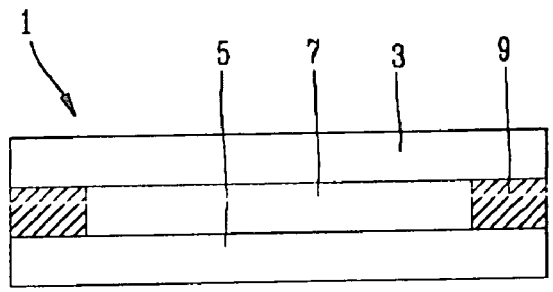
FIG. 1 illustrates a cross sectional view of a related art LCD device.
Figure 2:
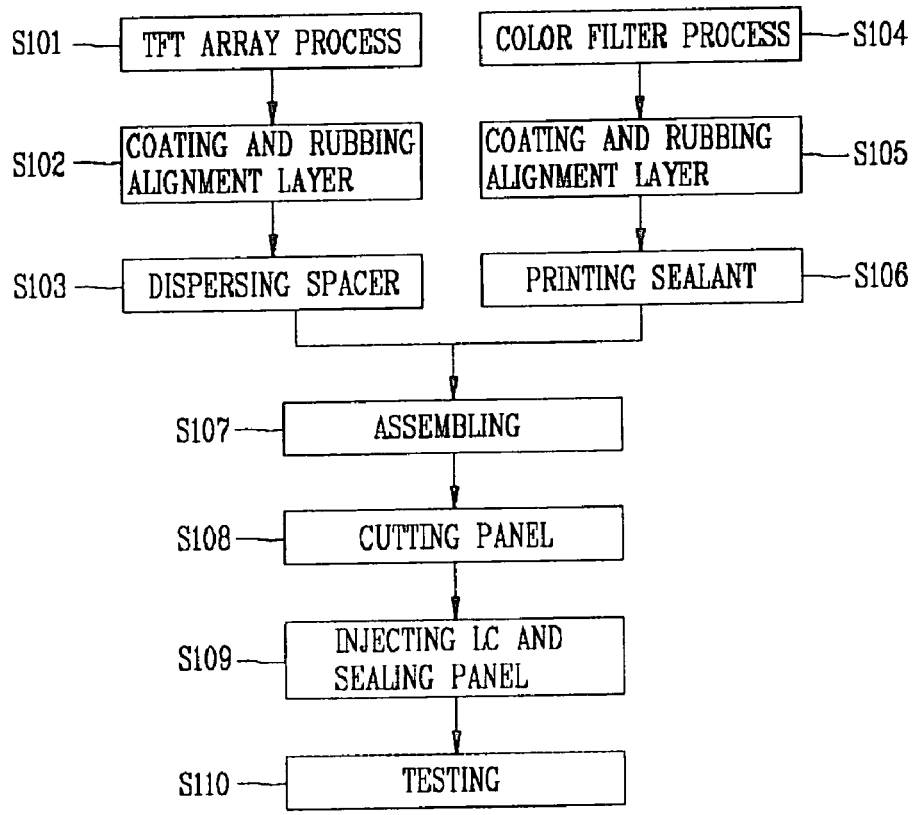
FIG. 2 illustrates a flow chart of a related art method for fabricating the LCD device shown in FIG. 1.
Figure 3:
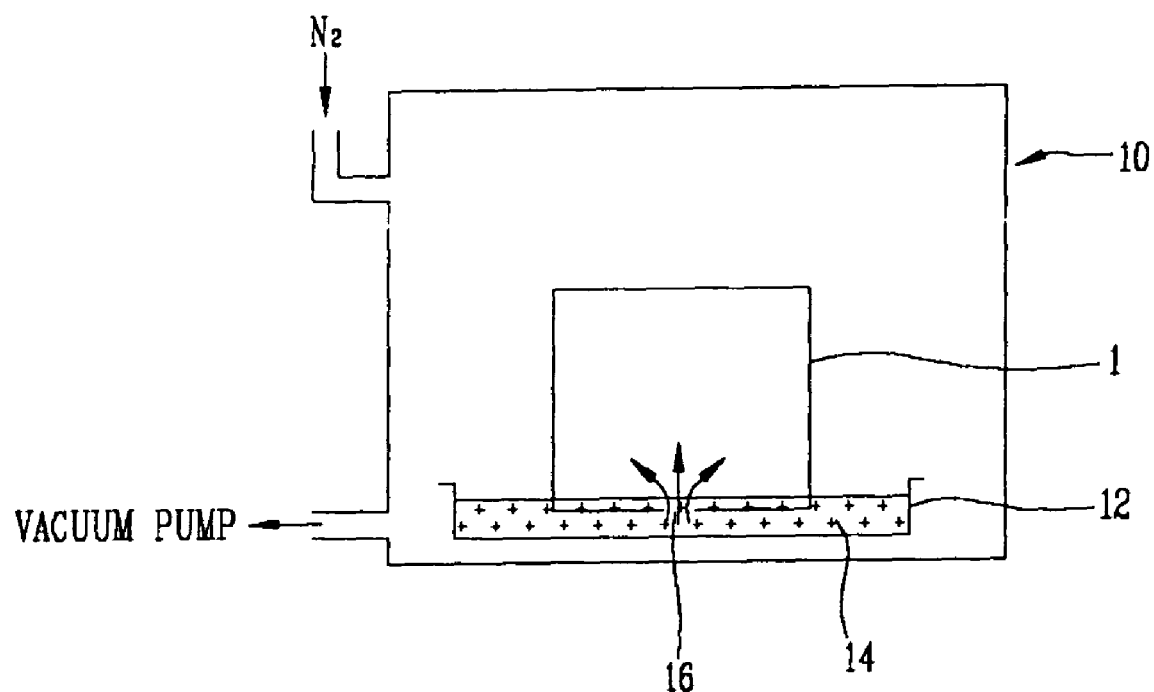
FIG. 3 illustrates a related art liquid crystal injection system for fabricating the related art LCD device.

Specifically, the related art fabrication processes as illustrated in FIG. 2 involve injecting liquid crystal material into a predefined cell gap through a liquid crystal injection hole defined within sealant material followed by sealing the liquid crystal injection hole. Although not shown in FIG. 2, upon injecting the liquid crystal material 14 into the cell gap of the unit panel 1 (see FIG. 3), outer surfaces of the unit LCD panel 1 contact liquid crystal material 14 contained within the container 12 and must be washed after the cell gap is completely filled with liquid crystal material 14.

The liquid crystal dispensing processes illustrated in FIG. 5, however, involve dispensing liquid crystal material directly onto a substrate, thereby eliminating the need to form any seal or liquid crystal injection hole. Moreover, because the liquid crystal material is dispensed directly onto the substrate, outer surfaces of a subsequently LCD panel need not be washed to remove liquid crystal material. Accordingly, LCD panels may be fabricated more simply using the liquid crystal dispensing method than using the related art dipping/vacuum injection methods. Further, the liquid crystal dispensing method has a higher yield than the related art dipping/vacuum injection methods.

To fabricate LCD panels using the liquid crystal dispensing method, dispensing positions (i.e., positions on a substrate where droplets of liquid crystal material are to be dispensed) and droplet amounts (e.g., amounts of liquid crystal material within each droplet of liquid crystal material) heavily influence the formation of a liquid crystal layer having a desired thickness. Because the thickness of a liquid crystal layer is closely related to, for example, the volume of the cell gap of the LCD panel, dispensing positions and droplet amounts must be controlled precisely to avoid fabricating a defective LCD panel. Accordingly, the principles of the present invention provide a liquid crystal dispensing dispenser that ensures that actual dispensing positions and droplet amounts are precisely controlled to match predetermined dispensing positions and droplet amounts.

Figure 6:
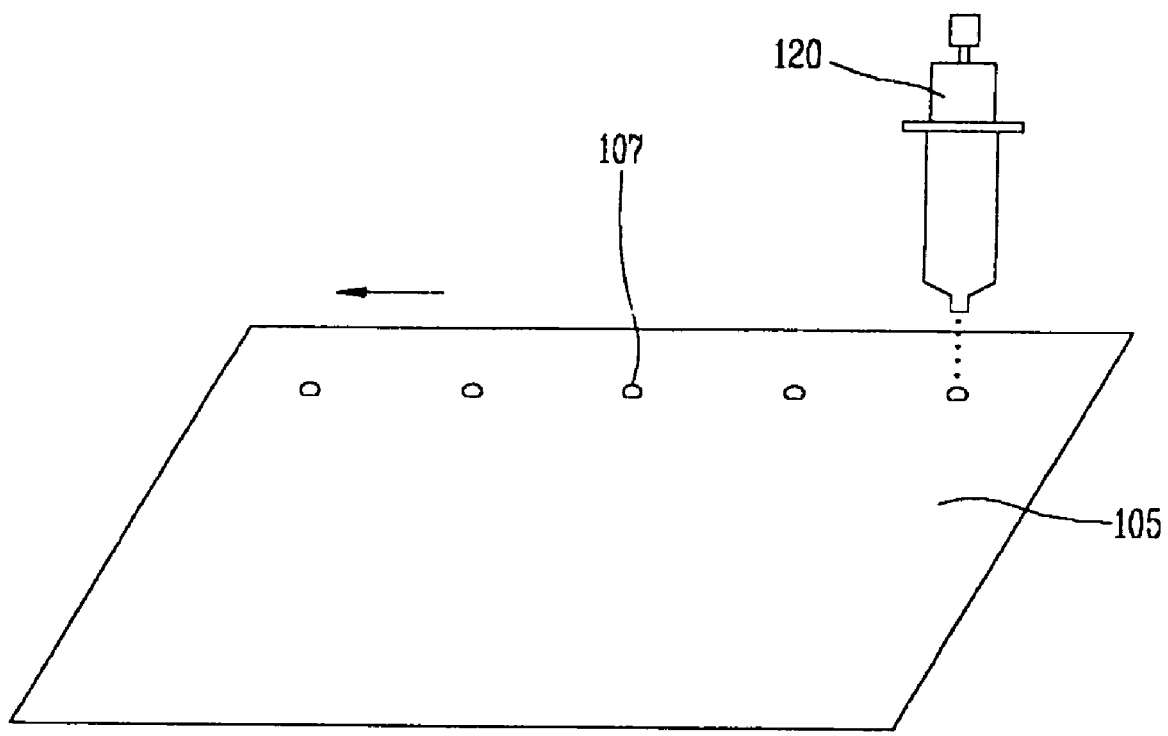
FIG. 6 illustrates a liquid crystal dispensing method.

FIG. 6 illustrates a liquid crystal dispensing method in accordance with principles of the present invention.

Referring to FIG. 6, a liquid crystal dispenser may be arranged above the lower substrate 105 (e.g., a glass substrate). Further, droplets of liquid crystal material 107 may be dispensed from the liquid crystal dispenser 120.

In one aspect of the present invention, droplets of liquid crystal 107, spaced apart from each other at predetermined distances, may be formed by fixing a position of the lower substrate 105, moving the liquid crystal dispenser 120 along x- and y-directions at a predetermined speed, and causing the liquid crystal dispenser 120 to discharge predetermined amounts of liquid crystal material within predetermined time intervals onto the lower substrate 105. Due to the movement and possible vibration of the liquid crystal dispenser 120, the liquid crystal droplets 107 may be undesirably misshapen, contain more or less liquid crystal material than the predetermined droplet amount, and not be aligned with predetermined dispensing positions. To cure such potential defects, and in an alternate aspect of the present invention, liquid crystal droplets 107, spaced apart from each other at predetermined distances, may be formed by fixing a position of the liquid crystal dispenser 120, moving the substrate 105 along x- and y-directions at a predetermined speed, and causing the liquid crystal dispenser 120 to discharge predetermined amounts of liquid crystal material within predetermined time intervals onto the lower substrate 105.

Figure 7:
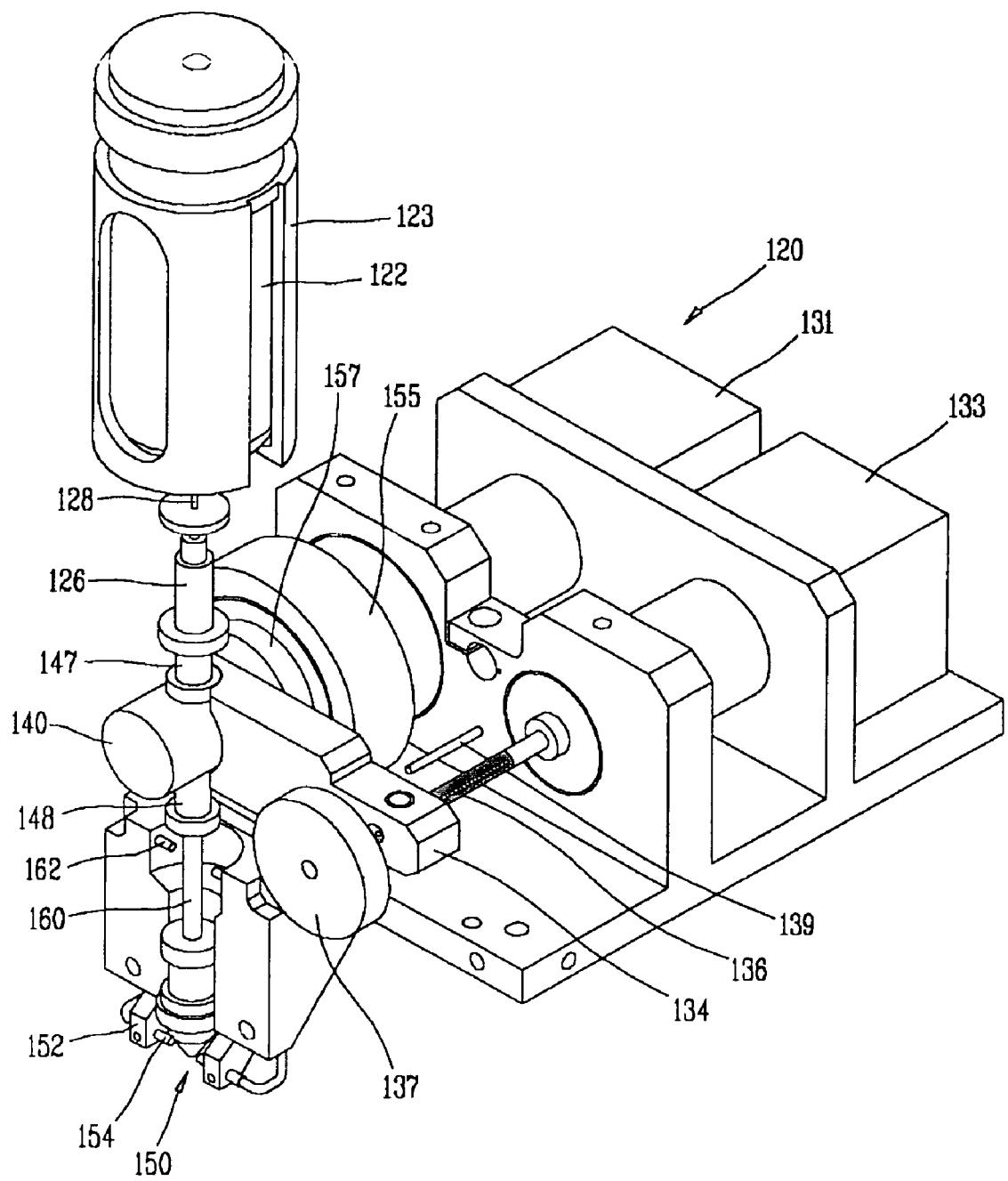
FIG. 7 illustrates a perspective view of a liquid crystal dispenser according to principles of the present invention.
Figure 8:
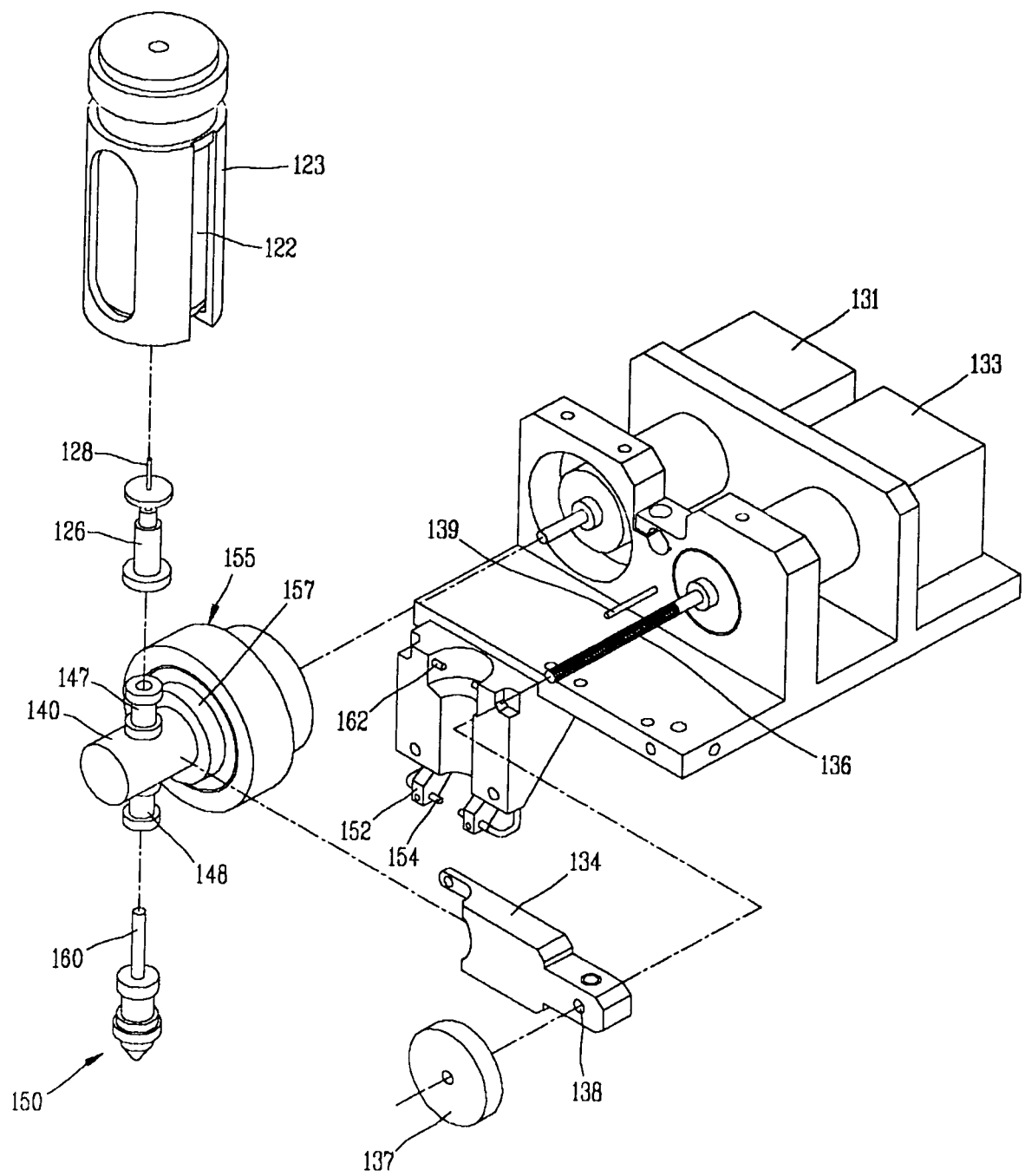
FIG. 8 illustrates an exploded perspective view of the liquid crystal dispenser shown in FIG. 7.

FIG. 7 illustrates a perspective view of a liquid crystal dispenser according to principles of the present invention. FIG. 8 illustrates an exploded perspective view of the liquid crystal dispenser shown in FIG. 7.

Referring to FIGS. 7 and 8, the liquid crystal dispenser 120 of the present invention may, for example, include a container 122 that contains liquid crystal material. Accordingly, the liquid crystal droplets 107 may, for example, be dispensed from liquid crystal material contained within the container 122.

In one aspect of the present invention, the container 122 may, for example, be cylindrically shaped. In another aspect of the present invention, the container 122 may be formed of an easily deformable material (e.g., polyethylene, or the like).

According to principles of the present invention, the liquid crystal droplets may be imprecisely dispensed onto a substrate if the container 122 deforms during the dispensing. Accordingly, the container 122, provided as described above, may be accommodated within a case 123, wherein the case 123 may, for example, be formed of a material that is relatively difficult to deform compared to the material from which the container 122 is formed (e.g., stainless steel, or the like). Alternatively, the container 122 itself may be formed of a material that does not easily deform (e.g., stainless steel, or the like) and the necessity of the case 123 may be eliminated altogether, thereby reducing the complexity and overall cost of the liquid crystal dispenser 120.

In one aspect of the present invention, the container 122 may be formed of a material that is substantially inert with respect to the liquid crystal material (e.g., polyethylene, or the like). In another aspect of the present invention, however, the container 122 may be formed of any structurally suitable material and the interior walls of the container 122 may be coated with a material such as a fluorine resin to prevent liquid crystal material contained therein from chemically reacting with sidewalls of the container 122.

A gas supply tube (not shown) may be arranged at an upper portion of the container 122 to transport an inert gas (e.g., nitrogen) into portions of the container 122 that are not occupied by the liquid crystal material contained therein. In one aspect of the present invention, the gas may be used to pressurize the container 122, facilitating the liquid crystal material contained therein to be dispensed onto the substrate.

According to principles of the present invention, a liquid crystal discharge pump 140 may be arranged at a lower portion of the container 122. The liquid crystal discharge pump 140 may be used to discharge predetermined amounts of liquid crystal material, contained within the container 122, onto a substrate. Therefore, a liquid crystal suction opening 147 may, for example, be formed at an upper portion of the liquid crystal discharge pump 140 and a liquid crystal discharge opening 148 may, for example, be formed at a lower portion of the liquid crystal discharge pump 140. During all operation of the liquid crystal dispenser 120, the liquid crystal suction opening 147 may, for example, convey liquid crystal material drawn from the container 122 into the liquid crystal discharge pump 140. Similarly, during all operation of the liquid crystal dispenser 120, the liquid crystal discharge opening 148 may, for example, convey liquid crystal material discharged from the liquid crystal discharge pump 140 to a nozzle 150.

According to principles of the present invention, a first connecting tube 126 may be coupled to the liquid crystal suction opening 147. In one aspect of the present invention, the liquid crystal suction opening 147 may be coupled to the first connecting tube 126 by being inserted into the first connecting tube 126. In another aspect of the present invention, the liquid crystal suction opening 147 may be coupled to the first connecting tube 126 via a coupling means (e.g., a screw, or the like). In still another aspect of the present invention, the liquid crystal suction opening 147 may be integrally formed with the first connecting tube 126.

According to principles of the present invention, a hollow pin 128 (e.g., an injection needle) may be formed at one side of the first connecting tube 126 and a pad (not shown), formed of a highly compressible material and capable of forming a hermetic seal (e.g., silicon, butyl rubber material, or the like), may be arranged at a lower portion of the container 122. According to principles of the present invention, the pin 128 may be inserted through the pad and into the container 122. Upon insertion of the pin 128, the pad presses against the outside wall the pin 128, preventing liquid crystal material from leaking outside of the pin 128, and liquid crystal material contained within the container 122 may be transported into the liquid crystal suction opening 147. Because the liquid crystal suction opening 147 and the container 122 are coupled to each other via the pill/pad structure discussed above, the liquid crystal suction opening 147 may be simply coupled and decoupled to the container 122.

According to principles of the present invention, the nozzle 150 may be connected to the liquid crystal discharge opening 148 via a second connecting tube 160 to facilitate the dispensing of liquid crystal material discharged from the liquid crystal discharge pump 140 onto the substrate. In one aspect of the present invention, the second connecting tube 160 may be formed of an opaque material. However, liquid crystal material contained within the liquid crystal material container 122 may, at some point, contain vapor (e.g., in the form of bubbles). For example, vapor may be introduced into the liquid crystal material at the liquid crystal discharge pump 140. The presence and amount of vapor cannot precisely controlled nor can it be completely removed before the liquid crystal material is dispensed onto the substrate, even if a vapor removing device is employed. When the liquid crystal material contains vapor, the dispensing positions and droplet amounts cannot be precisely controlled and a defective LCD panel can be potentially fabricated. Therefore, one way to prevent the dispensing positions and droplet amounts from being imprecisely controlled is to stop the operation of the liquid crystal dispenser as soon as it is determined that vapor is present. Accordingly, and in an alternative aspect of the present invention, the second connecting tube 160 may be formed of a suitably transparent material, enabling a suitable visual inspection to determine the presence of vapor contained within the liquid crystal material and ensuring that dispensing positions and droplet amounts may be precisely controlled. A first sensor 162 (e.g., a photo coupler, or the like) may be arranged at opposing sides of the second connecting tube 160 to detect the presence of vapor within the discharged liquid crystal material.

According to principles of the present invention, a protection unit 152 may be arranged at a lower portion of the nozzle 150 to protect opposing sides of the nozzle 150 from external stresses, etc. Further, a second sensor 154 may be arranged at the protection unit 152 to detect the presence of vapor within the liquid crystal material dispensed from the nozzle 150 and/or to detect the presence of liquid crystal material accumulated on the surface of the nozzle 150 (i.e., residual liquid crystal material). In one aspect of the present invention, the second sensor 154 may be provided as, for example, a photo coupler, or the like.

The liquid crystal dispenser according to the principles of the present invention is capable of precisely controlling the amount of liquid crystal material dispensed through a nozzle 150 and onto a substrate by varying a fixation angle of the liquid crystal discharge pump 140 and by driving the liquid crystal discharge pump 140. However, the actual amount of liquid crystal material dispensed within each liquid crystal droplet may deviate from a predetermined amount when residual liquid crystal material is accumulated on the surface of the nozzle 150. Usually, the residual liquid crystal material is accumulated because the nozzle 150 is formed of a metal such as stainless steel. Stainless steel has a high wetability (i.e., has a high surface energy/is highly hydrophilic) with respect to liquid crystal material. Therefore, the contact angle (i.e., the angle formed when a liquid is in thermodynamic equilibrium with the surface of a solid) formed between the nozzle 150 and the liquid crystal material is low and, therefore, liquid crystal material spreads over the surface of nozzle 150. Because the liquid crystal material spreads over the nozzle 150, the amount of liquid crystal material actually dispensed onto the substrate as a liquid crystal droplet is less than the predetermined amount, increasing the likelihood of defectively fabricating an LCD panel. Moreover, as the dispensing operation is repeated, portions of the accumulated residual liquid crystal material may be dispensed with liquid crystal material discharged from the liquid crystal discharge pump 140, causing the amount of liquid crystal material actually dispensed onto the substrate as a droplet to be greater than the predetermined droplet amount and, again increasing the likelihood of defectively fabricating an LCD panel.

Therefore, to reduce the accumulation of residual liquid crystal material on the surface of the nozzle 150, a material having a low wetability (i.e., a low surface energy/highly hydrophobic) with respect to the liquid crystal material and forming a large contact angle with liquid crystal material (e.g., fluorine resin, or the like), may be deposited on the surface of the nozzle 150 by any suitable method (e.g., dipping, spraying, or the like). Alternatively, the nozzle 150 may be completely formed from the material having a low wetability with respect to the liquid crystal material (e.g., fluorine resin, or the like). Such a nozzle 150 may thus be used once or multiple times. By providing the nozzle 150 with the material having the low wetability, less liquid crystal material may spread over the surface of the nozzle 150 and more liquid crystal material may be dispensed onto the substrate through the nozzle 150. As a result, the amount of liquid crystal material actually dispensed onto the substrate as a liquid crystal droplet may be substantially equal to the predetermined amount.

According to principles of the present invention, the liquid crystal discharge pump 140 may be coupled to (e.g., inserted into) a rotating member 157. The rotating member 157 may be fixed to a fixing unit 155 and coupled to a first motor 131. Therefore, as the first motor 131 is operated, the rotating member 157 rotates which, in turn, causes the liquid crystal discharge pump 140 to dispense liquid crystal material contained within the liquid crystal container 122 onto a substrate.

According to principles of the present invention, the amount of liquid crystal material discharged from the liquid crystal material container 122 via the liquid crystal discharge pump 140 may be varied in accordance with a fixation angle between the liquid crystal discharge pump 140 and the rotating member 157 (i.e., the angle at which a portion of the liquid crystal discharge pump 140 is fixed to the rotating member 157). Therefore, the liquid crystal discharge pump 140 may, for example, contact a first end of a bar shaped liquid crystal capacity amount controlling member 134. A hole 138 may be formed at a second end of the liquid crystal capacity amount controlling member 134 and a rotational shaft 136 may be inserted into the hole 138. A first end of the rotational shaft 136 may be connected to a second motor 133 and a second end of the rotational shaft 136 may be connected to an angle controlling lever 137. The rotational shaft 136 may be rotated either automatically upon driving the second motor 133 or manually upon operating the angle controlling lever 137. A screw (not shown) may be formed at a periphery of the hole 138 and the rotational shaft 136 so as to couple the liquid crystal capacity amount controlling member 134 to the rotational shaft 136. Upon rotating the rotational shaft 136, the second end of the liquid crystal capacity amount controlling member 134 may move along a linear axis of the rotational shaft 136, wherein the direction of the rotating determines the direction in which the second end of the liquid crystal capacity amount controlling member 134. As a result of the movement of the second end of the liquid crystal capacity amount controlling member 134, the fixation angle may be varied.

Accordingly, the first motor 131 may operate to cause the liquid crystal discharge pump 140 to dispense liquid crystal material from the liquid crystal material container 122 onto the substrate while the second motor 133 may operate to control the fixation angle and thus to control the amount of liquid crystal material dispensed by the liquid crystal discharge pump 140 during its operation.

According to principles of the present invention, individual amounts of liquid crystal material dispensed within each droplet are very minute. Further, variations in the droplet amounts are also very minute. Therefore, minute variations in the fixation angle must be precisely controlled. To effect such precise control in the fixation angle, the second motor 133 may be provided as a step motor operated by a pulse input value, a servo motor, or the like.

Figure 9A:
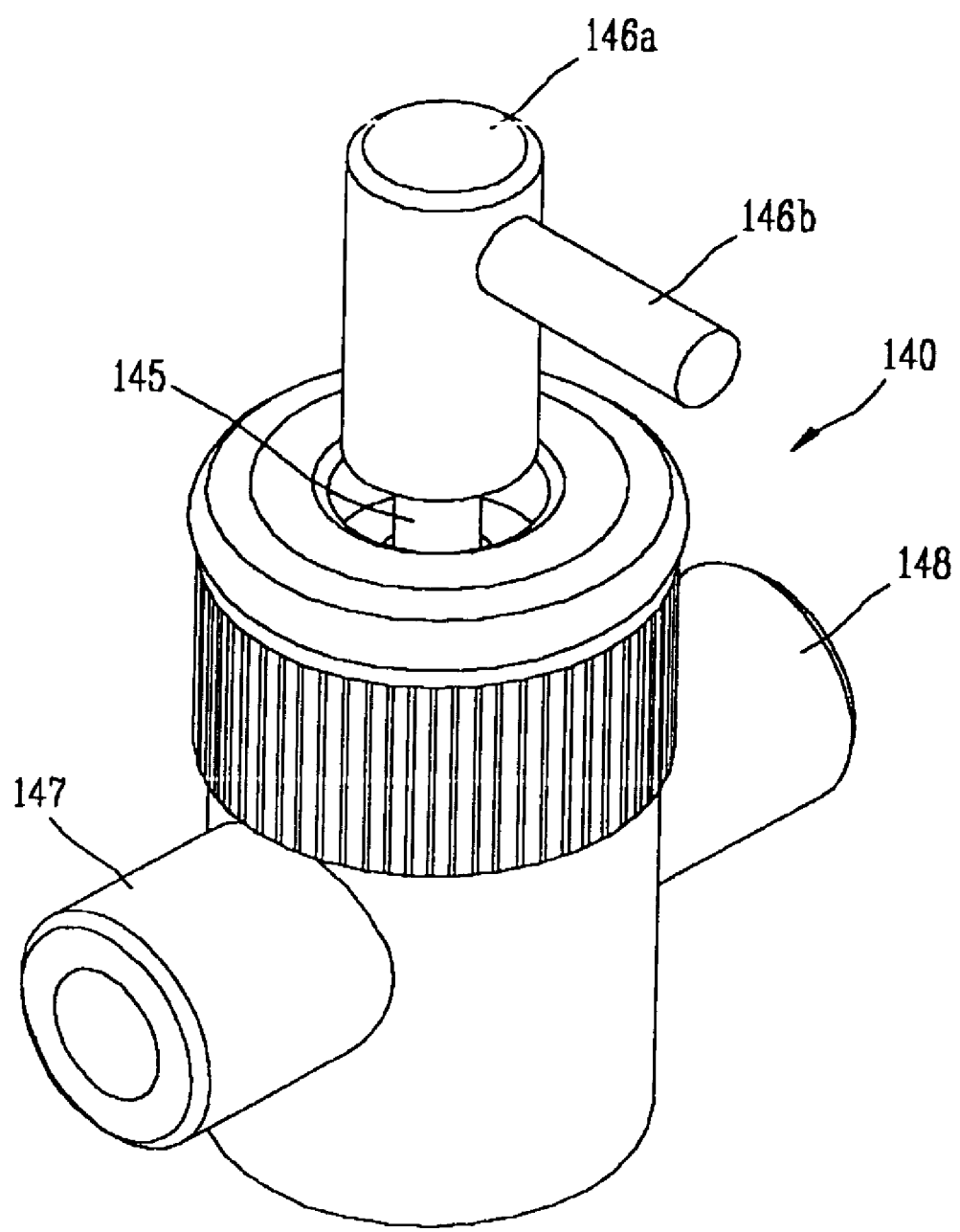
FIG. 9A illustrates a perspective view of a liquid crystal discharge pump of the liquid crystal dispenser according to principles of the present invention.
Figure 9B:
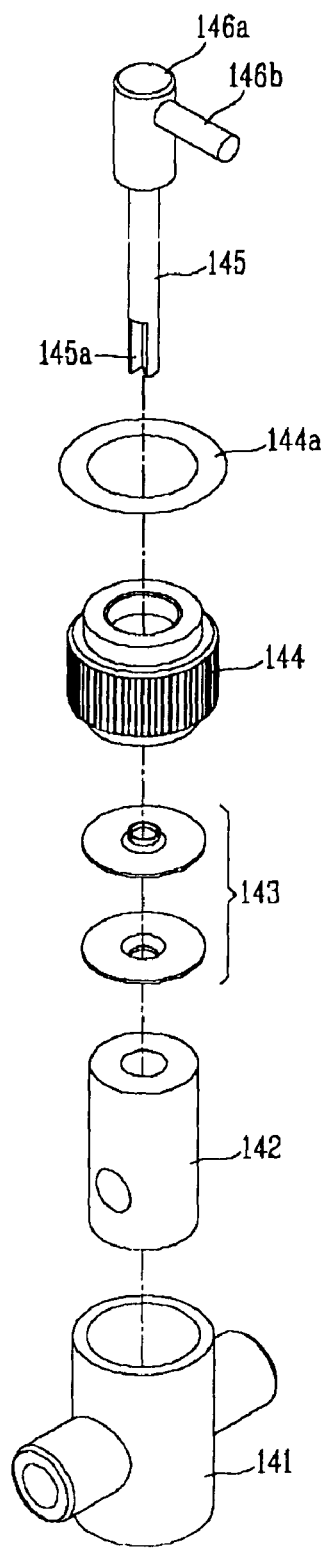
FIG. 9B illustrates an exploded perspective view of the liquid crystal discharge pump shown in FIG. 9A.

FIG. 9A illustrates a perspective view of a liquid crystal discharge pump of the liquid crystal dispenser according to principles of the present invention. FIG. 9B illustrates an exploded perspective view of the liquid crystal discharge pump shown in FIG. 9A.

Referring to FIGS. 9A and 9B, the liquid crystal discharge pump 140 of the present invention may, for example, include a case 141, wherein the case 141 includes the liquid crystal suction and discharge openings 147 and 148, respectively; a cap 144 coupled to the case 141, wherein an upper portion of the cap 144 includes all opening; a cylinder 142 arranged within the case 141 for conveying liquid crystal material drawn from the container 122; a sealing means 143 for sealing the cylinder 142; an o-ring 144a arranged at an upper portion of the cap 144 for preventing liquid crystal material from leaking outside the liquid crystal discharge pump 140; a piston 145 arranged within the cylinder 142 through the opening of cap 144, the piston 145 being rotatable and axially translatable within the cylinder 142 (e.g., along the vertical axis as illustrated in FIGS. 9A and 9B) for drawing in and discharging liquid crystal material through the liquid crystal suction opening 147 and the liquid crystal discharge opening 148, respectively; a head 146a arranged at an upper portion of the piston 145 and fixed to the rotating member 157; and a bar 146b arranged at the head 146a. In one aspect of the present invention, the bar 146b may be inserted within a hole (not shown) of the rotating member 157. Accordingly, the piston 145 may rotate when the rotating member 157 is rotated by the first motor 131.

Referring to FIG. 9B, a groove 145a may be formed at an end portion of the piston 145. In one aspect of the present invention, the groove 145a may occupy no more than about 25% of a cross-sectional area of the piston 145. In another aspect of the present invention, the groove 145a may open and close the liquid crystal suction opening 147 and the liquid crystal discharge opening 148 upon rotating the piston 145 to draw in and discharge liquid crystal material through the liquid crystal suction opening 147 to the liquid crystal discharge opening 148.

An exemplary operation of the liquid crystal discharge pump 140 will now be explained in greater detail below with reference to FIG. 10.

Figure 10:
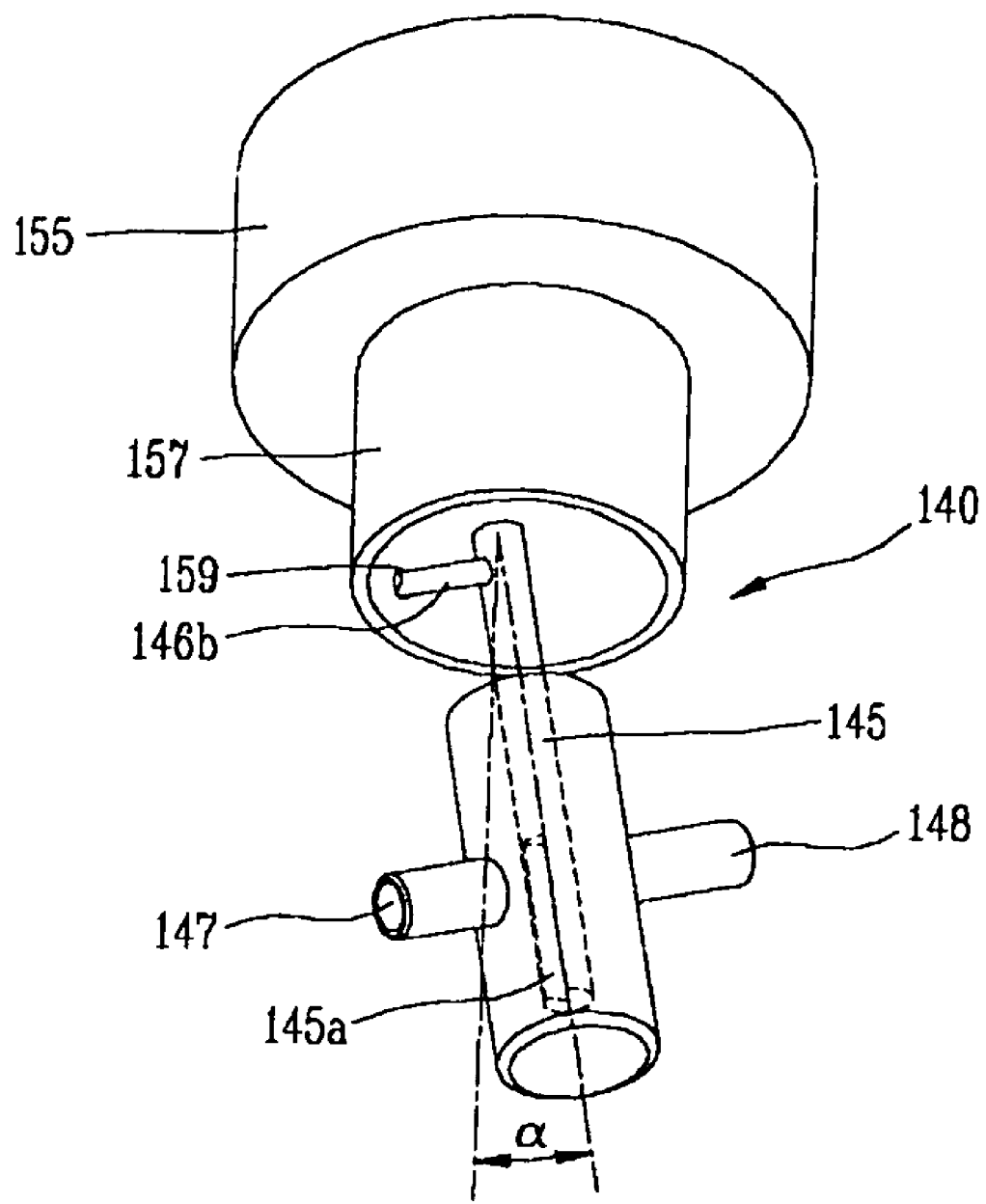
FIG. 10 illustrates a view of the liquid crystal discharge pump fixed to a rotating member at a fixation angle.

Referring to FIG. 10, the piston 145 of the liquid crystal discharge pump 140 may be fixed to the rotating member 157 at a predetermined angle, α (i.e., the fixation angle). For example, the bar 146b formed at the piston head 146a may be inserted into a hole 159 formed within the rotating member 157 to fix the piston 145 to the rotating member 157. Because the bar 146b is fixed within the hole 159, the piston 145 rotates as the rotating member 157 rotates. A bearing (not shown) may be provided within the hole 159 to allow the bar 146b of the piston 145 to move in back and forth and right and left directions with respect to the hole 159. Upon operating the first motor 131, the rotating member 157 may be rotated while the piston 145 may also be rotated and axially translated within the cylinder 142.

If the fixation angle (α) is 0°, the piston 145 rotates only about the axis of the rotating member 157. However, if the fixation angle (α) of the piston 145 is substantially not 0°, the piston 145 may rotate about an off-axis angle with respect to the rotating member 157 (e.g., transverse and longitudinal rotation) and may also move along the axis of the cylinder 142.

For example, the piston 145 may be rotated a predetermined amount within an interior space of the cylinder 142 to allow liquid crystal material within the liquid crystal suction opening 147 to be drawn into the cylinder 142. Upon rotating the piston 145 within the cylinder 142 further, liquid crystal material drawn into the cylinder 142 may be discharged into the liquid crystal discharge opening 148. To facilitate the aforementioned drawling-in (or suction) and discharge operations, the groove 145a may be selectively arranged to be in fluid communication with the liquid crystal suction and discharge openings 147 and 148, as will be discussed in greater detail with respect to FIGS. 11A to 11D.

Figure 11A:
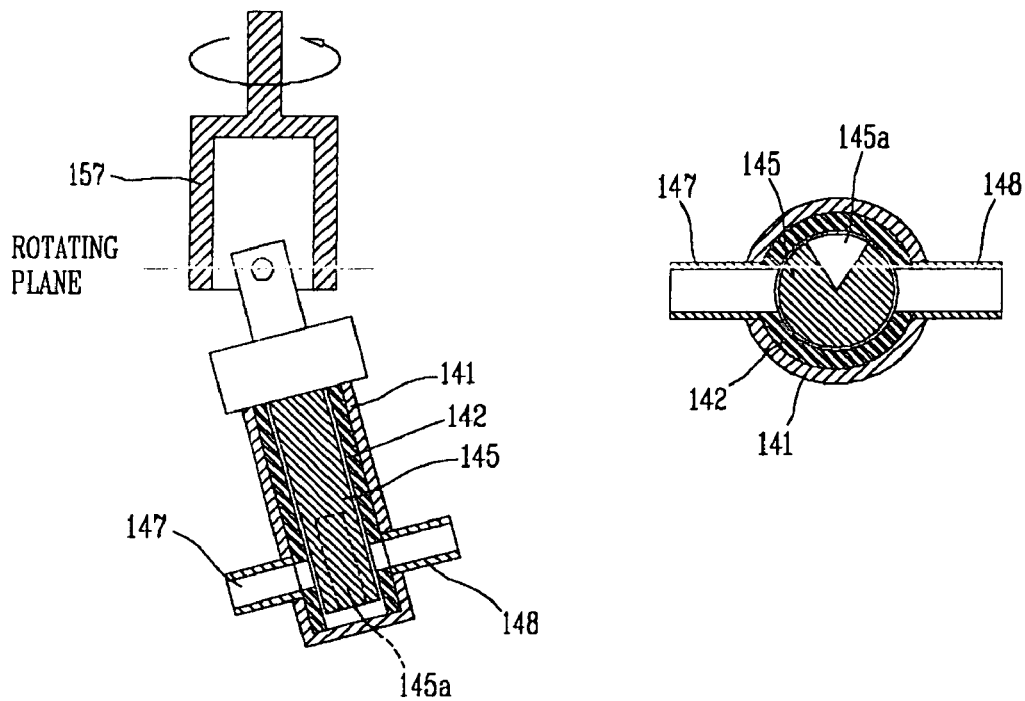
FIGS. 11A to 11D illustrate operational views of the liquid crystal discharge pump according to principles of the present invention.
Figure 11B:
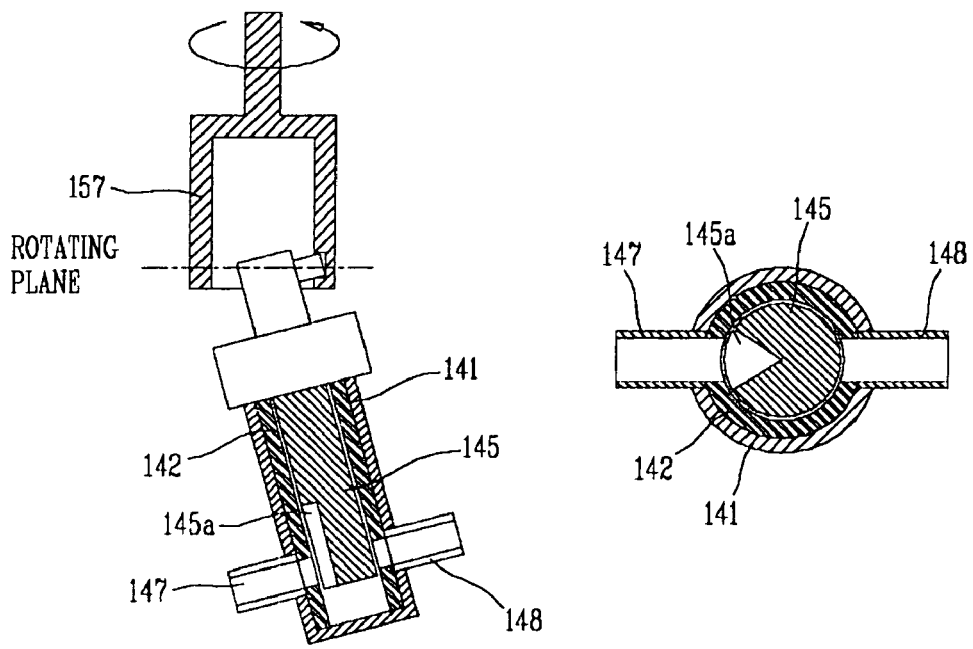
Figure 11C:
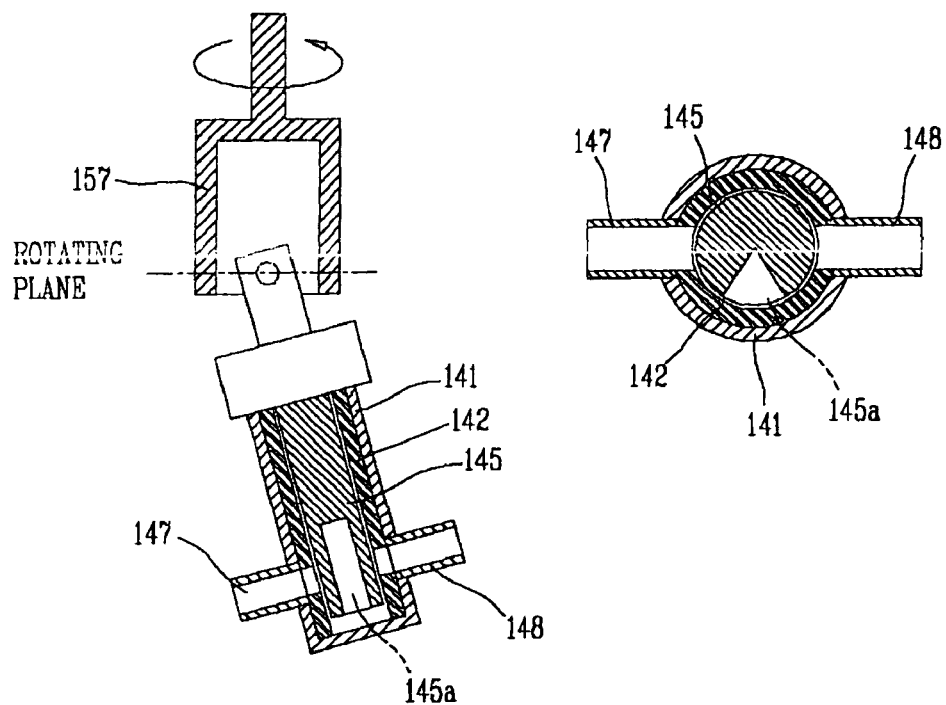
Figure 11D:
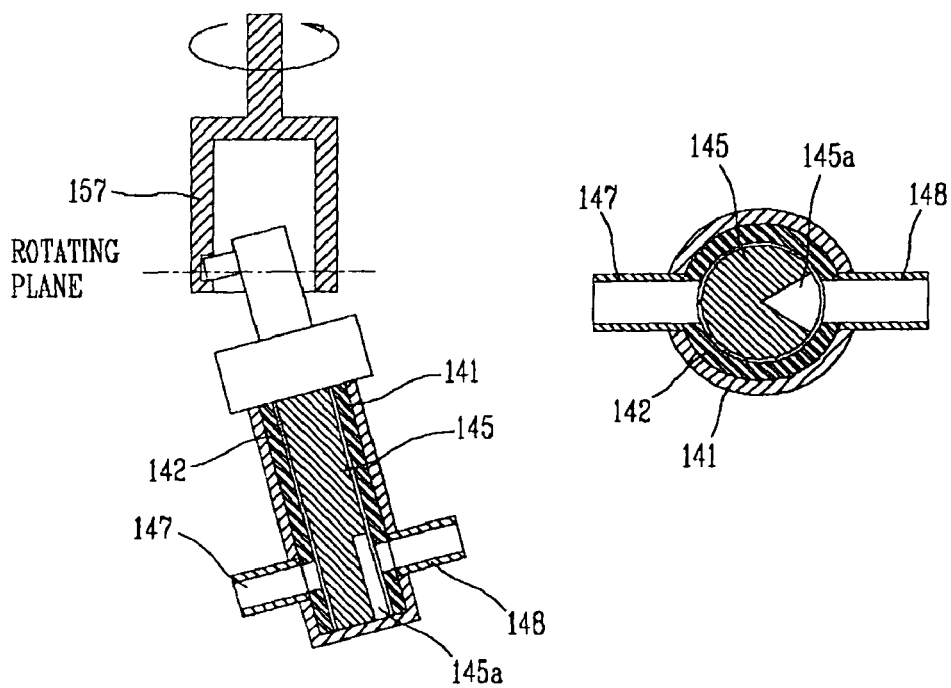

Referring generally to FIGS. 11A to 11D, liquid crystal material contained within the liquid crystal material container 122 is discharged to the nozzle 150 through four strokes of the liquid crystal discharge pump 140. FIGS. 11A and 11C illustrate cross strokes, FIG. 111B illustrates a suction stroke at the liquid crystal suction opening 147, and FIG. 11D illustrates a discharge stroke at the liquid crystal discharge opening 148.

Referring specifically to FIG. 11A, the piston 145, fixed to the rotating member 157 at the fixation angle (a), rotates in accordance with the rotation of the rotating member 157. In the cross stroke shown in FIG. 11A, both the liquid crystal suction opening 147 and the liquid crystal discharge opening 148 are closed by the piston 145.

Upon rotating the rotating member 157 approximately 45°, the piston 145 rotates within the cylinder 142 to arrange the groove 145a to be in fluid communication with the liquid crystal suction opening 147, as shown in FIG. 11B. Because the piston 145 is fixed to the rotating member 157 at a predetermined fixation angle, the bar 146b rotates along the plane in which the rotating member 157 rotates while the piston 145 moves axially out of the cylinder 142 and rotates within the cylinder 142 to arrange the groove 145a in fluid communication with the liquid crystal suction opening 147. Upon arranging the groove 145a to be in fluid communication with the liquid crystal suction opening 147, liquid crystal material within the liquid crystal suction opening 147 is drawn into the cylinder 142 and groove 145a. The suction stroke illustrated in FIG. 11B, arranging the groove 145a in fluid communication with the liquid crystal suction opening 147, thus 'opens' the liquid crystal suction opening 147.

Upon farther rotating the rotating member 157 approximately 45°, the piston 145 rotates within the cylinder 142 to arrange the groove 145a between the liquid crystal suction and discharge openings 147 and 148, as shown in FIG. 11C. The cross stroke illustrated in FIG. 11C, arranging the groove 145a between the liquid crystal suction and discharge openings 147 and 148, thus 'closes' the liquid crystal suction opening 147.

Upon further rotating the rotating member 157 approximately 45°, the piston 145 moves axially into the cylinder 142 and rotates within the cylinder 142 to arrange the groove 145 to be in fluid communication with the liquid crystal discharge opening 148, as shown in FIG. 11D. Upon arranging the groove 145a to be in fluid communication with the liquid crystal discharge opening 148, liquid crystal material is discharged from the cylinder 142 and groove 145a into the liquid crystal discharge opening 148. The discharge stroke illustrated in FIG. 11D, arranging the groove 145a to be in fluid communication with the liquid crystal discharge opening 148, thus 'opens' the liquid crystal discharge opening 148.

As described above, the liquid crystal discharge pump 140 repeats four consecutive strokes (i.e., the first cross stroke, the suction stroke, the second cross stroke, and the discharge stroke), to discharge the liquid crystal material, contained in the liquid crystal material container 122, to the nozzle 150. According to principles of the present invention, the amount of liquid crystal material discharged by the liquid crystal discharge pump 140 may be varied according to the fixation angle, α, regulating the degree to which the piston 145 rotates off the axis of the rotating member 157 and thus regulating the degree to which the piston 145 moves along the axis of the cylinder 142.

Figure 12:
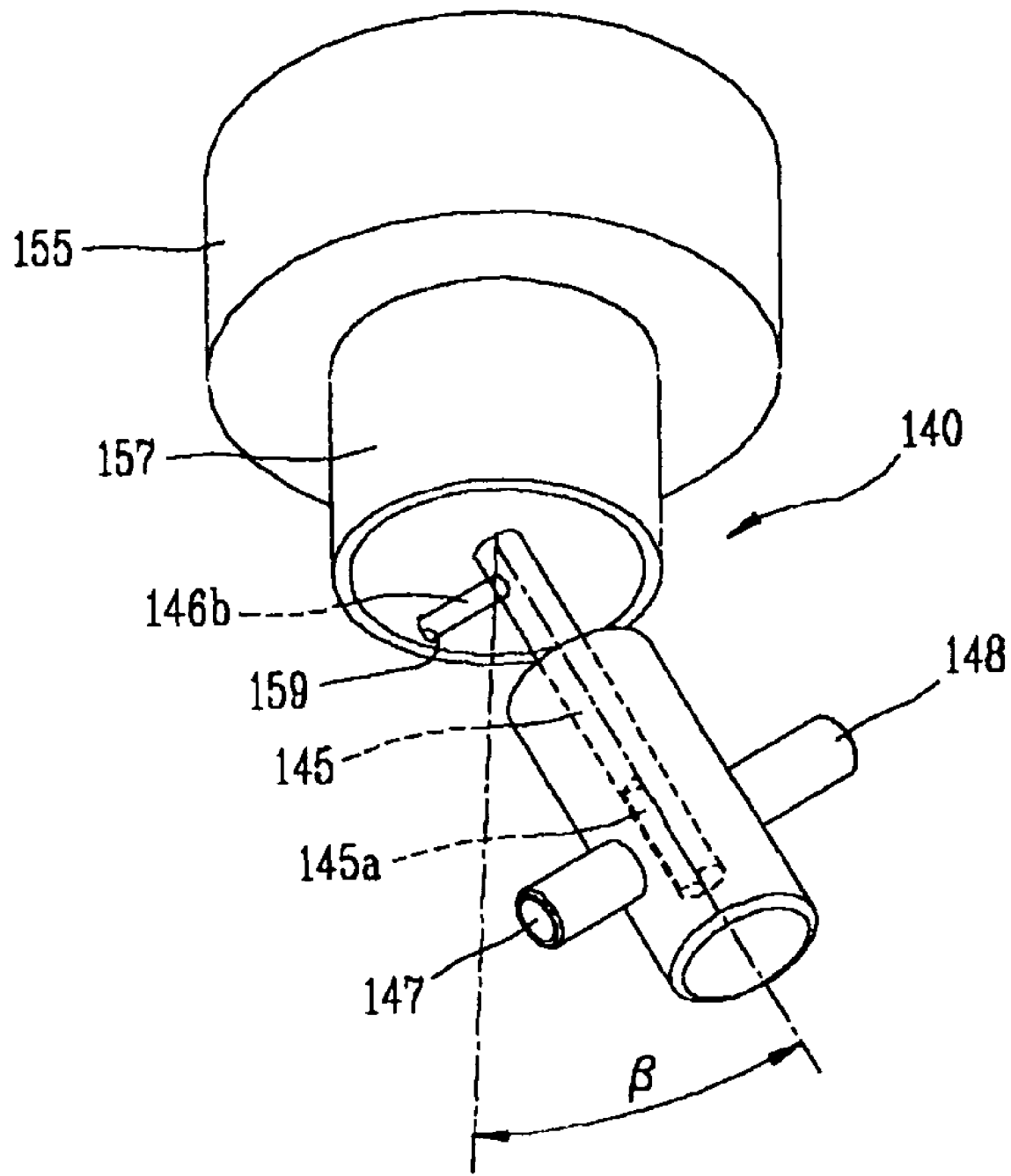
FIG. 12 illustrates a view of the liquid crystal discharge pump fixed to a rotating member at an increased fixation angle.

FIG. 12 illustrates a view the liquid crystal discharge pump fixed to the rotating member at a predetermined angle β.

As described above with respect to FIG. 10, the liquid crystal discharge pump 140 shown in FIG. 10 may be fixed to the rotating member 157 at a fixation angle α. However, as shown in FIG. 12, the liquid crystal discharge pump 140 may be fixed to the rotating member 157 at a fixation angle of β, wherein β>α. Accordingly, the degree of off-axis rotation of piston 145, with respect to the rotating member 157 shown in FIG. 12 may be greater than the degree of off-axis rotation of piston 145 shown in FIG. 10. Accordingly, as the fixation angle increases, the degree to which the piston 145 is axially translated along the axis of the cylinder 142 increases, thereby increasing the amount of liquid crystal material that may be drawn into, and discharged from, the cylinder 142 per revolution of the rotating member 157.

Therefore, the principles of the present invention allow the amount of liquid crystal material discharged to be controlled by adjusting the fixation angle. In one aspect of the present invention, the fixation angle may be controlled by the liquid crystal capacity amount controlling member 134 shown in FIG. 7. In another aspect of the present invention, the liquid crystal capacity amount controlling member 134 may be moved by driving the second motor 133. Therefore, the fixation angle may be controlled by adjusting the second motor 133. Alternatively, the fixation angle may be controlled by manually adjusting the angle controlling lever 137.

In one aspect of the present invention, the fixation angle of the liquid crystal discharge pump 140 may be measured by a sensor 139. In another aspect of the present invention, the sensor 139 may include a linear variable differential transformer. Accordingly, if the fixation angle exceeds a predetermined angle, the sensor 139 may communicate an alarm to a user, preventing the liquid crystal discharge pump 140 from being damaged.

According to principles of the present invention, the liquid crystal dispenser 120 described above may dispense liquid crystal material directly onto an LCD panel region of a base substrate. In one aspect of the present invention, the first and/or second motors 131 and 133 may be connected to, and controlled by, a control unit (not shown) via wired or wireless means. As used herein, the term "LCD panel region" indicates the particular area of a base substrate from which an LCD panel will be eventually formed. In one aspect of the present invention, the control unit may determine (e.g., calculate) a total amount of liquid crystal material to be dispensed onto an LCD panel region using predetermined input information.

According to principles of the present invention, the amount of liquid crystal material dispensed onto an LCD panel region may, for example, correspond to the height of a spacer incorporated within an LCD panel eventually formed from using the LCD panel region. The spacer maintains a substantially uniform cell gap within the subsequently formed LCD panel. Patterned (e.g., column) spacers are often incorporated within LCD panels fabricated according to the aforementioned liquid crystal dispensing method. In one aspect of the present invention, patterned spacers may be formed by depositing photoresist material over a base substrate by a spin coating process and photolithographically patterning the spin-coated photoresist material.

The amount of liquid crystal material dispensed corresponds to the spacer height because, the width, and thus the volume, of the cell gap of a subsequently formed LCD panel increases as the spacer height increases. Accordingly, the control unit may, for example, determine the total amount of liquid crystal material dispensed onto an LCD panel region based, at least in part, on the spacer height of a spacer to be incorporated within a subsequently formed LCD panel.

According to principles of the present invention, the total amount of liquid crystal material to be dispensed onto an LCD panel region may, for example, be determined by two factors: 1) the amount of liquid crystal material contained within a single liquid crystal droplet (i.e., droplet amount); and 2) the number of liquid crystal droplets dispensed (i.e., the dispensing pattern). Accordingly, at least one of the droplet amount and the dispensing pattern may be determined in accordance with the spacer height of a spacer to be incorporated within an LCD panel formed using the particular LCD panel region.

As discussed above, droplet amounts are very minute and are susceptible to variation due to various factors. When variation in the droplet amount occurs, too much or not enough liquid crystal material may be contained within the liquid crystal droplet, thereby increasing the possibility of fabricating a defective LCD panel. Thus, to minimize the extent to which too much or not enough liquid crystal material is contained within a liquid crystal droplet, the droplet amount should be periodically determined to ensure that the droplet amount is within an acceptable range. In one aspect of the present invention, the droplet amount may be determined by measuring the weight of a plurality of liquid crystal droplets. Thus, the weight of the plurality of dispensed liquid crystal droplets may, for example, be measured using a measuring means such as a gravimeter assembly. In another aspect of the present invention, the droplet amount may be determined by measuring the volume of a plurality of liquid crystal droplets. Thus, the volume of the plurality of dispensed liquid crystal droplets may, for example, be measured using a measuring means such as a measuring cup (i.e., a suitably transparent, graduated cup).

As discussed above, variations in the droplet amounts are very minute. Accordingly, the approximate weight or volume of a single dispensed liquid crystal droplet may be measured by dispensing a predetermined number of liquid crystal droplets (e.g., 10, 50, 100, etc.) onto the measuring means and then dividing the total weight or volume of liquid crystal droplets dispensed by the number of liquid crystal droplets dispensed. That is, the weight or volume of a liquid crystal droplet may approximated by calculating the average weight or volume of a predetermined number of liquid crystal droplets.

According to principles of the present invention, it is acceptable for the calculated average weight or volume of a liquid crystal droplet to be within a predetermined range of a predetermined liquid crystal droplet weight or volume. If, however, the calculated aver-age weight or volume of a liquid crystal droplet is outside (i.e., above or below) the predetermined range, the dispensing operation is stopped and the difference between the calculated average liquid crystal droplet weight or volume and the predetermined liquid crystal droplet weight or volume is determined. Subsequently, the control unit may drive the second motor 133, or the controlling lever 137 may be operated, to move the liquid crystal capacity amount controlling member 134 in an amount corresponding to the determined difference between the calculated liquid crystal droplet weight or volume and the predetermined liquid crystal droplet weight or volume, thereby varying the fixation angle of the liquid crystal discharge pump 140 and causing liquid crystal droplets containing a desired amount of liquid crystal material to be dispensed.

According to principles of the present invention, the aforementioned measuring means may be separately provided to a liquid crystal dispensing system including at least one of the aforementioned liquid crystal dispensers 120. When the measuring means is a gravimeter assembly and is separately provided with the liquid crystal dispensing system, a cup may be provided on a robot arm to be selectively positioned between a lower portion of the nozzle 150 and a gravimeter. During operation, the robot arm may position the cup at the lower portion of the nozzle 150, the liquid crystal dispenser may dispense a predetermined number of liquid crystal droplets, the robot arm may position the cup at the gravimeter, and the gravimeter may measure the weight of the liquid crystal material dispensed into the cup. When the measuring means is a measuring cup and is separately provided with the liquid crystal dispensing system, the cup may be provided on the robot arm to be selectively positioned between the lower portion of the nozzle 150. During operation, the robot arm may position the measuring cup at the lower portion of the nozzle 150, the liquid crystal dispenser may dispense a predetermined number of liquid crystal droplets, and the total volume of the liquid crystal material dispensed into the measuring cup may be measured.

In another aspect the present invention, however, at least one measuring means may be integrally provided with the liquid crystal dispensing system including at least one of the aforementioned liquid crystal dispensers 120. For example, the at least one measuring means may be provided within a range of motion of the liquid crystal dispenser 120 to measure the weight or volume of liquid crystal droplets dispensed by a corresponding liquid crystal dispenser 120.

Figure 13:
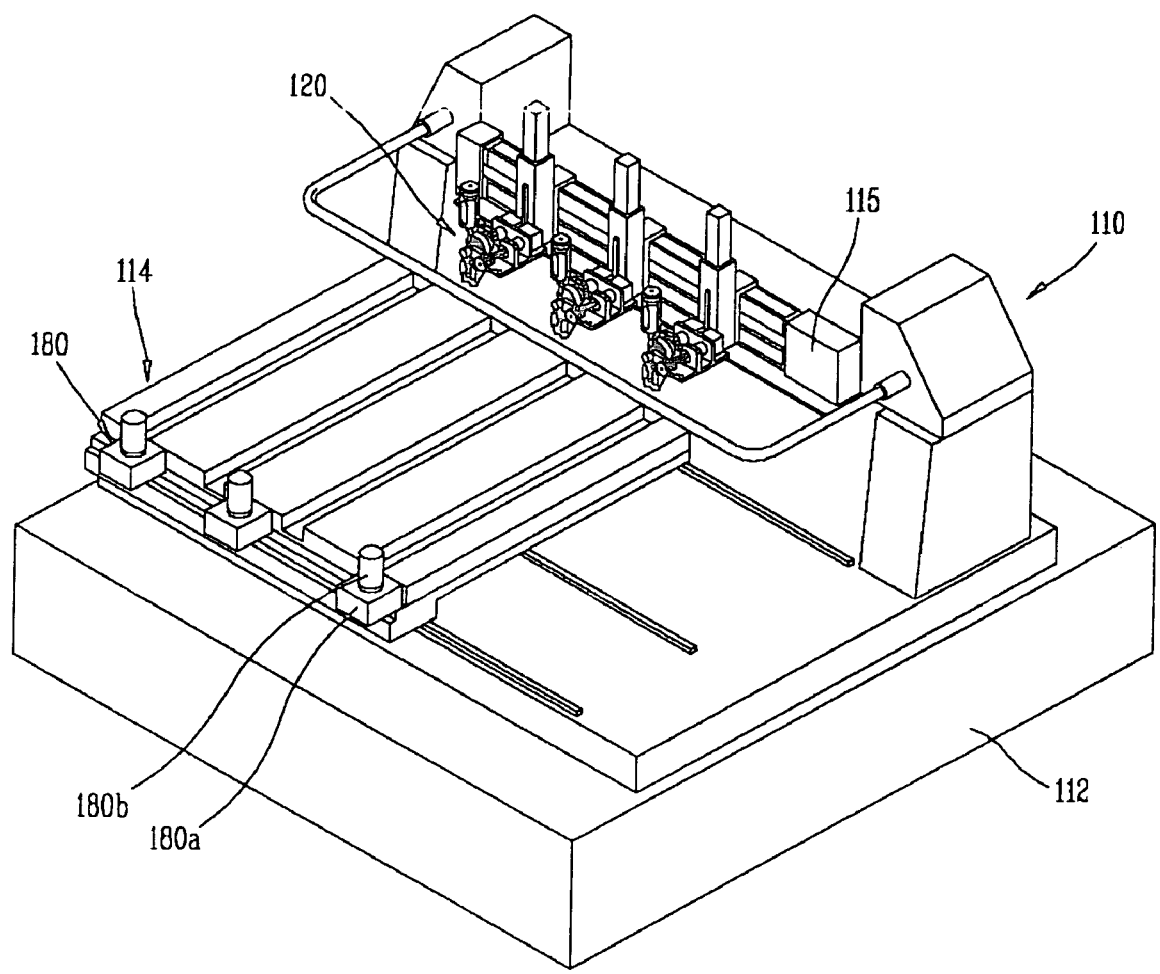
FIG. 13 illustrates a liquid crystal dispensing system incorporating a gravimeter according to principles of the present invention.

FIG. 13 illustrates a liquid crystal dispensing system incorporating the measuring means according to principles of the present invention.

Referring to FIG. 13, a liquid crystal dispensing system 110 according to principles of the present invention may, for example, include a frame 112, a stage 114 coupled to the frame 112, a guide bar assembly 115 moveably coupled to the frame 112, a plurality of liquid crystal dispensers 120 moveably coupled to the guide bar assembly 115, and a plurality of measuring means coupled to, for example, the stage 114 or the frame 112. In one aspect of the present invention, the measuring means are provided as at least one gravimeter assembly 180. In another aspect of the present invention, at least one gravimeter assembly 180 may, for example, include a gravimeter 180*a* and a cup 180*b* coupled to a top portion of the gravimeter 180*a*. In still another aspect of the present invention, the measuring means may be provided as at least one a measuring cup.

During operation, a substrate (not shown) may be transferred onto the stage 114 by a robot arm (not shown), wherein any of the aforementioned processes (e.g., TFT forming process, color filter forming process, etc.) may have been previously performed on the substrate. The guide bar assembly 115 may then be driven along a first direction over the stage 114, each liquid crystal dispenser 120 may be driven along a second direction, substantially perpendicular to the first direction, and each liquid crystal dispenser 120 may dispense liquid crystal material onto the substrate.

After a predetermined number of liquid crystal droplets have been dispensed, after a predetermined amount of time has elapsed, and/or after liquid crystal material has been dispensed onto a predetermined number of LCD panel regions, the guide bar assembly 115 may be driven to be arranged over the measuring means. Where the measuring means is provided as the illustrated gravimeter assemblies, the guide bar assembly 115 may be driven to be arranged over the cups 180*b* of the gravimeter assemblies 180 and the liquid crystal dispensers 120 may be driven to dispense a predetermined number of liquid crystal droplets into the cups 180*b*. The gravimeters 180*a* may then measure the total weight of the dispensed liquid crystal droplets dispensed into the cups 180*b*. In one aspect of the present invention, the gravimeter 180*a* of each gravimeter assembly 180 may be connected to the control unit and transmit, in real time, the measured the total weight of the dispensed liquid crystal droplets to the control unit. The control unit may then calculate the average weight of the predetermined number of liquid crystal droplets, determine whether the difference between the calculated average weight and the predetermined liquid crystal droplet weight is outside the predetermined range of the predetermined liquid crystal droplet weight, and suitably adjust an operation of the liquid crystal dispensers if the difference between the calculated average weight and the predetermined liquid crystal droplet weight is outside the predetermined range.

Where the measuring means is provided as the unillustrated measuring cup, the guide bar assembly 115 may be driven to be arranged over the measurement cups and the liquid crystal dispensers 120 may be driven to dispense a predetermined number of liquid crystal droplets into the measuring cups. An operator may then visually measure the total volume of the dispensed liquid crystal droplets dispensed into the measuring cups. In one aspect of the present invention, the operator may then input the measured total volume to the control unit, where the control unit may then adjust an operation of the liquid crystal dispensers 120 as discussed above based on the measured total volume input by the operator.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for dispensing a liquid crystal, comprising:
    loading a substrate onto a stage;
    aligning the substrate with a nozzle of a liquid crystal dispenser;
    operating the liquid crystal dispenser to dispense a plurality of liquid crystal droplets containing liquid crystal material from the nozzle onto the substrate;
    dispensing a predetermined number of liquid crystal droplets into a measuring means;
    determining an average amount of liquid crystal material contained within the liquid crystal droplets dispensed into the measuring means; and
    adjusting an operation of the liquid crystal dispenser based on the determining to dispense a plurality of liquid crystal droplets containing liquid crystal material from the nozzle onto the substrate.

2. The method of claim 1, wherein determining the average amount of liquid crystal material contained within the liquid crystal droplets dispensed into the measuring means includes determining the average weight of liquid crystal material contained within the liquid crystal droplets dispensed into the measuring means.

3. The method of claim 2, wherein determining the average weight of liquid crystal material contained within the liquid crystal droplets dispensed into the measuring means includes:
    measuring the total weight of liquid crystal material dispensed into the measuring means; and
    dividing the total weight by the predetermined number of liquid crystal droplets dispensed into the measuring means.

4. The method of claim 1, wherein determining the average amount of liquid crystal material contained within the liquid crystal droplets dispensed into the measuring means includes determining the average volume of liquid crystal material contained within the liquid crystal droplets dispensed into the measuring means.

5. The method of claim 4, wherein determining the average volume of liquid crystal material contained within the liquid crystal droplets dispensed into the measuring means includes:
    measuring the total volume of liquid crystal material dispensed into the measuring means; and
    dividing the total volume by the predetermined number of liquid crystal droplets dispensed into the measuring means.

6. The method of claim 1, wherein dispensing the predetermined number of liquid crystal droplets into the measuring means includes moving the nozzle over at least a portion of the measuring means.

7. The method of claim 1, wherein dispensing the predetermined number of liquid crystal droplets into the measuring means includes moving at least a portion of the measuring means beneath the nozzle.

8. The method of claim 1, further including dispensing the predetermined number of liquid crystal droplets into the measuring means periodically.

9. The method of claim 1, wherein adjusting the operation of the liquid crystal dispenser includes adjusting the amount of liquid crystal material contained within each liquid crystal droplet.

\* \* \* \* \*